United States Patent Office 2,744,206
Patented May 1, 1956

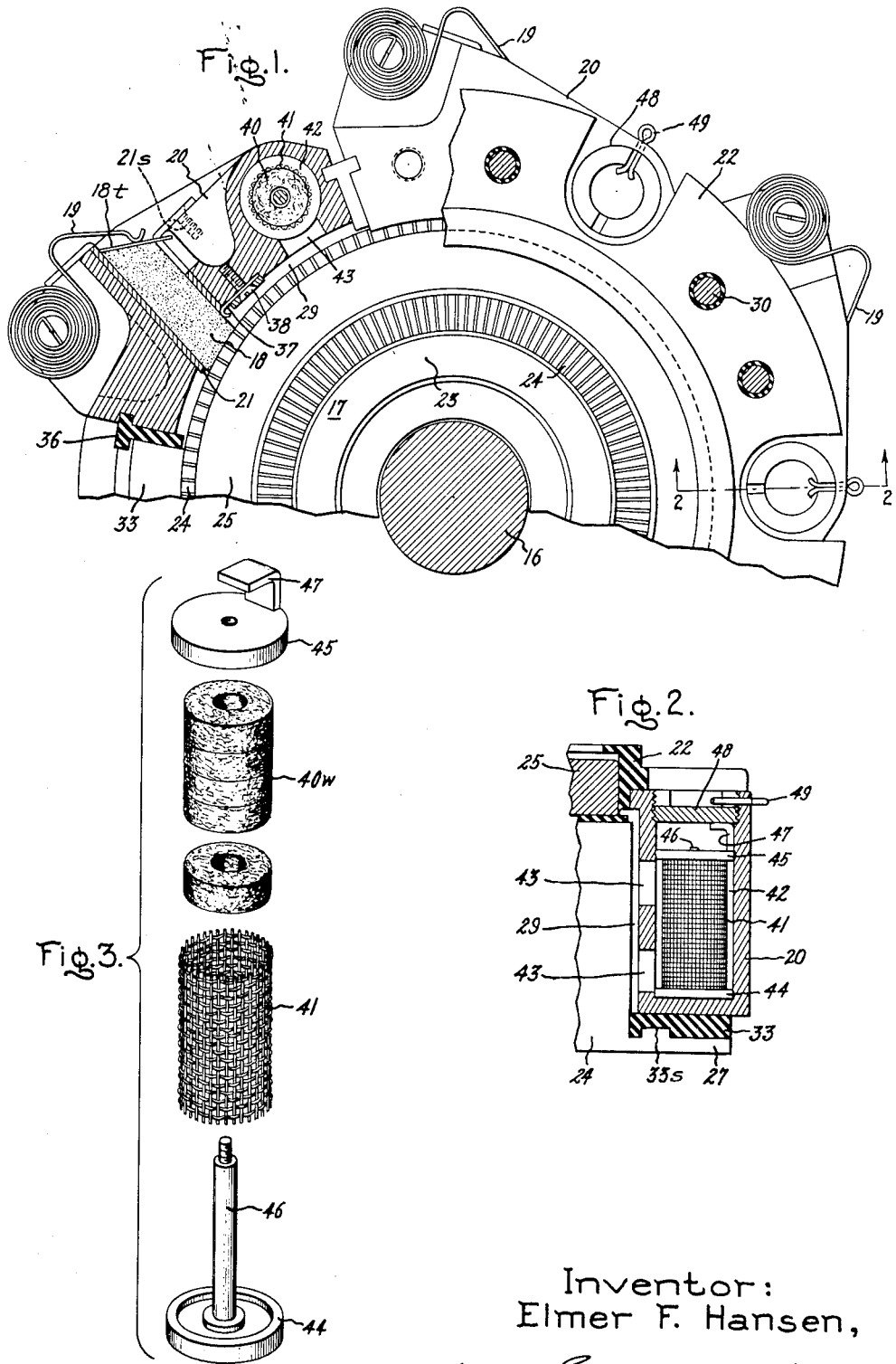

2,744,206

VAPOR GENERATOR CARTRIDGE CHAMBER AND CARTRIDGE FOR DYNAMOELECTRIC MACHINE COLLECTORS

Elmer F. Hansen, Marblehead, Mass., assignor to General Electric Company, a corporation of New York Application August 2, 1951, Serial No. 239,874

6 Claims. (Cl. 310—228)

My invention relates to vapor generators and has particular significance in connection with vapor lubrication for overcoming electric contact difficulties as in commutating type dynamoelectric machines for high flying aircraft.

It is well known that at high altitudes, ordinary, or even specially treated, carbon commutating brushes required for electrical equipment tend to rapidly dust away unless suitably protected from the rarefied and dry atmosphere. Such protection is rendered difficult because of the large blasts of cooling air required to cool the associated electrical equipment, such as the commutator and brushes themselves. The idea of using a shielded collector with mating brush and collector surfaces thereby isolated from the cooling air blast, and with the shielding enclosure continually, during operation, supplied with a brush life enhancing vapor, has been disclosed and claimed in copending application Serial No. 213,385, filed March 1, 1951 (Pat. No. 2,703,372) by Robert H. Savage and assigned to the assignee of the present invention. In said application Savage has disclosed for use within the collector shielding enclosure a heat responsive vapor generator for providing the necessary vapor. Under certain conditions, a difficulty has been that in arrangements such as those proposed by Savage, the vapor generator cannot be readily replaced and is, furthermore, so surrounded by insulation material that it cannot perform its proper function of exuding vapor at a rate responsive to requirements and over a large surface, while at the same time remaining free of all mechanical holding or vibration stresses.

It is an object of the present invention to provide simple and inexpensive means for overcoming the above-mentioned difficulties.

A further object of the present invention is to provide a readily replaceable cartridge adapted to hold a vapor generating material substantially unencumbered by surrounding material apt to interfere with the vaporizing action.

In accordance with one aspect of my invention, I eliminate the problems of mechanical holding stresses while at the same time providing a large vapor generating surface by providing a vapor generator cartridge in the form of a readily replaceable cylindrical member having enlarged end portions designed to hold a heat responsive vapor forming material within said member with a clearance thereabout for a full 360 degrees when said cartridge is mounted in a substantially cylindrical chamber provided in a brushholding and collector sealing unitary metallic member, thereby to provide a maximum of vapor lubrication for said collector to prevent or limit wear of brushes or other sliding contacts applied on said collector in the region of said collector shield, with the ready replaceability of said cartridge serving to greatly reduce maintenance time for any machine with which it is used.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a cross-sectional view of a collector shield and brushholder progressively broken away and showing a cartridge chamber containing the cartridge of the present invention; Fig. 2 is a sectional view along the line 2—2 of Fig. 1 and showing the cartridge in side elevation; and Fig. 3 is an exploded view of the cartridge itself.

Referring now to Fig. 1, I have shown an end elevation view of a commutator 17 with brushes 18 urged by brush feed springs 19 radially inward toward the commutator periphery. The arrangement is for a dynamoelectric machine such as an aircraft generator having a central shaft 16 adapted to drive the collector, which in the illustrated embodiment is the commutator 17. The entire commutator is completely surounded by an assembly of the brushes 18 and brushholders comprising arcuate metallic main body portions 20 arranged to provide vapor generator enclosing means in good heat exchanging relationship with the brushes, and at the same time to provide a seal about the collector for vapor lubrication thereof in a most efficient manner. Such an arrangement, of a brushholder assembly which also serves as a holder for vapor generators, as a collector seal and as a good heat exchanging medium is not my invention but is the invention of Irving Kalikow and is fully described and claimed in his copending application Serial No. 239,877, filed August 2, 1951, and assigned to the assignee of the present invention. As described in the Kalikow application, the combination brushholder, collector shield, and vapor generator holder comprises an assembly of like arcuate segments 20 of metallic material interspersed by radial insulators 36 of suitable insulating material, with the individual arcuate main body portions 20 held in sealing relationship with the commutator periphery by one or more end flanges 22 and 33 of a material (such as an organic glass fiber laminate plastic material) selected for its good electrical insulating properties. In the arrangement illustrated in both the Kalikow application and in Fig. 1 of the present application, a plurality of six brush positions are assumed so that each of the arcuate main metallic body portions 20 subtends substantially 60 degrees. In Fig. 1 of the present application I have shown the assembly progressively broken away around the circumference to first show an end view of the axially outermost shielding flange 22, and then a portion of one end of a main body portion 20, and then a cross-section through a main body portion 20, and finally (with the associated brushholding body portion 20 removed) the opposite or inner axial end sealing flange 33. As disclosed in said Kalikow application, a brush box 21 of stainless steel and held in place by one or more screws 21s may be interposed between each brush and the brushholding main body segment 20 and the commutator 17 may comprise a central shell 23, individual commutator segments 24, and one or more shrink rings 25 adapted to hold the assembled segments securely on said shell, and the inner and outer sealing rings 22 and 33 are adapted to form a running seal between the stationary brushholder and the rotatable collector, with, for example, the ring 22 making a running clearance with shrink ring 25, and the ring 33 secured to the opposite axial end of the brushholder assembly forming a running seal with the opposite end of the commutator segments 24. The commutator segments 24 may be provided with riser portions 27 (Fig. 2) forming a labyrinth seal with stationary ring 33 slotted as shown at 33s to engage a corresponding projection on the rotating risers.

The main body portions 20 are radially spaced from the periphery of the collector to define a chamber 29 thereabouts, with this chamber sealed at the axial ends by the flanges 22 and 33. As more fully disclosed in the aforesaid Kalikow application, it is contemplated that some means will be used to hold the sealing rings to the metallic body portions to define the ends of sealed chamber 29. Thus, a plurality of screws 30 (shown in section in Fig. 1) may hold ring 22 clamped between metallic brushholder segments 20 and some other member (not shown) and additional screws (not shown) may be used to fasten ring 33 to the opposite ends of the metallic segments. Since the assembled brushholders together with the brushes which they contain are designed to provide a sealed chamber, spring means for sealing brush side faces with brush box sides are provided and such means comprise the biased arrangement of feed springs 19 acting on metallic brush top 18t biased with respect to the axis of the brush to provide a side thrust on one of the faces of each associated brush while the opposite brush face is sealed by a spring member 37 secured to the metallic body 20 by one or more screws 38.

In order to supply the sealed chamber 29 with a suitable vapor for enhancing commutation, vapor generator means are provided comprising a vaporizable substance 40, such as liquid saturated wool or felt, surrounded by a cylindrical screen, or other foraminous covering 41, spaced from the walls of an axially extending cartridge receiving chamber 42 formed in each metallic main body portion 20. Each vapor generator cartridge of the present invention is designed to be inserted within one of the cylindrical chambers 42. Communication between each chamber 42 and the collector seal chamber 29 is provided by a plurality of radially extending holes 43, located in each of the main body portions which are designed to hold the individual vapor generator elements of the invention in good heat exchanging relationship with the commutating brushes 18. The purpose of each cartridge is to conveniently contain the wool, felt, or similar liquid saturated substance, or, if desired, a solid capable of subliming, and this substance will then supply a vapor at a rate dependent on the temperature (and conditions of air flow).

In Fig. 2, which is a cross-sectional view along the line 2—2 of Fig. 1, I have clearly shown the cartridge comprising the screen 41 spaced from, while surrounded through 360 degrees by, the cylindrical wall of chamber 42. Of course, I do not mean to limit the invention to a construction in which a meshed screen is used, for obviously the screen could be replaced by perforated sheet metal or any other foraminous covering (or even omitted entirely if the inner substance 41 has sufficient rigidity) without departing from the spirit and scope of the present invention.

In order to support the vapor generator, two end caps 44 and 45 are provided. If desired, the end caps may be turned to provide a flange for holding the screen or other covering or the inner substance itself in a satisfactory manner. In any event, I propose making these end disks, such as 44 and 45, so that they have an outer diameter which is substantially larger than the diameter of the vapor forming material or its foraminous covering 41, and which is slightly smaller than the bore of reservoir chamber 42, to the end that the cartridge may be readily inserted in the bore and thereafter there will be provided a clearance all around the vapor forming material or its covering so that vapor can exit from any part thereof around a 360 degree circumference, and then readily find its way into holes (such as 43) feeding into the main collector shield chamber 29.

Referring now to Fig. 3 which is an exploded view of the parts making up the vapor generator cartridge itself, it is seen that I have here shown the vapor forming substance comprising a plurality of separate washers 40w.

As shown most clearly in Fig. 3, a center post 46 may be used to interconnect the end caps. In the drawing, I have also shown an angle hook 47 secured to top cap 45 and which may be found useful to provide a way of pulling or prying the cartridge out of its cylindrical cavity for maintenance reasons (such as to replace or replenish the supply of fluid in substance 40).

As shown in Figs. 1 and 2, it may be found desirable to secure the cartridge in place as by a threaded sealing plug 48 arranged to engage threads provided in the brushholding and vapor generator holding metallic main body portion, and to be held securely in place therein as by a cotter key 49.

In accordance with the invention, the entire cartridge comprising saturated material 40, and end caps 44 and 45 (and in the illustrated embodiment screen 41), is designed to fit within the cylindrical chamber 42 being placed therein through one end of the metallic main body brushholder so that its axis lies in a plane passing through the axis of the commutator or other annular collector (for ease of replacement and best heat exchange between air blast and sealing brushholder, and between each brush and associated vapor cartridge).

There is thus provided a device of the character described, capable of meeting the objects hereinabove set forth to the end that a vapor generator cartridge and cartridge chamber is provided to allow maximum utilization of vapor generating surface, together with ease of assembly, low cost of construction, and secure holding of the vapor generator against vibrational or other stresses.

Each cartridge can be very readily inserted or removed whenever desired. Cartridges can be replaced whenever new requirements must be met, or, exhausted cartridges can be replaced by full cartridges by inexperienced help without the need of technical, such as chemical, skill. Thus, the ready replaceability of the cartridge of the invention promotes speed and convenience of maintenance, and eliminates many sources of possible error, such as using wrong amount, wrong chemical or wrong procedure.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the true spirit and scope of my invention.

What I claim as new and desire to secure by Letters Patent of the United States is:

1. For use in a dynamoelectric machine having a rotating annular current collector, brushes and a collector shielding brushholder assembly of arcuate metallic members defining a sealed chamber about said collector, the combination of means including a metallic wall formed in each of said metallic members for defining in each of said members a cylindrical chamber extending parallel to the axis of said collector, and a replaceable vapor generator cartridge in each such cylindrical chamber and comprising a vapor forming material, end caps arranged at each axial end of said material and a central rod extending through said material and interconnecting said end caps.

2. A vapor generator cartridge for a dynamoelectric machine commutator shielding brushholder metallic segment having a cylindrical cavity adapted to accommodate said cartridge, said cartridge comprising a material adapted to exude a vapor, annular end caps adapted to retain said material in said cylindrical cavity with a clearance with the annular walls of said cavity for 360 degrees about said material, and a center rod passing through said material and for interconnecting said end caps.

3. A vapor generator cartridge comprising washer-like cored disks of vapor generating substance such as liquid saturated felt or the like, annular end caps having a diameter larger than that of said disks and arranged one at each end thereof, a center rod extending through said washer-like disks and interconnecting said end caps, and a foraminous covering extending between said end caps within the inner diameters thereof and surrounding said disks to allow free circulation of vapor thereabout when said cartridge is placed in a cylindrical shaped opening large enough to accommodate said end caps.

4. In a dynamoelectric machine having an annular current collector and a brush holding and collector shielding assembly comprising a plurality of arcuate metallic segments each adapted to hold at least one collector contacting brush and having a cylindrical chamber provided with an internally threaded open end and arranged with the axis of said chamber parallel to the axis of said collector, a vapor generator cartridge in each of said chambers, each of said cartridges comprising a temperature responsive vapor producing substance, a cylindrical foraminous covering arranged about said substance, and concentric annular end caps holding said covering, said end caps having an outer diameter substantially larger than that of said covering and holding said covering away from the walls of said cylindrical chamber to provide a large vapor generating surface area, and said end caps having an outer diameter smaller than that of said cylindrical chamber to provide ready replaceability of said cartridge through the open end of said chamber, and a threaded sealing plug for engaging the threads of said open end to removably hold said cartridge in said chamber.

5. For use in dynamoelectric machine having an annular current collector member, current collector brushes, and a unitary metallic collector sealing and brush holding member at least partially defining a sealed chamber about said collector, a wall in said unitary metallic member defining a cylindrical cavity in communication with said sealed chamber and having its axis parallel to the axis of said collector, and a vapor generator cartridge comprising annular metallic end caps loosely fitting in the bore of said cylindrical cavity, a central rod interconnecting said end caps, a vapor generating substance arranged around said rod and between said end caps, and an annular foraminous covering around said substance and between said end caps, said covering having an outer diameter smaller than that of said end caps to provide a clearance thereabout for a full 360 degrees within said cylindrical cavity to provide a large area for vapor generation, and means for replaceably sealing said cartridge in said cavity to allow ready replaceability thereof.

6. In a dynamoelectric machine having an annular current collector member and a collector shielding assembly comprising a plurality of brushes and a plurality of arcuate metallic segments configured to hold said brushes and define a shielded enclosure about the periphery of said collector with each of said arcuate metallic segments having an open ended cylindrical reservoir chamber communicating with said sealed chamber and for receiving a cartridge and holding said cartridge in good heat exchanging relationship with at least one of said brushes, a vapor generator cartridge in each of said chambers and comprising a plurality of washers of heat responsive vapor generating substance, a cylindrical screen surrounding said washers, annular end caps having a diameter larger than that of said screen and smaller than that of said reservoir chamber and adapted to hold said screen spaced from the cylindrical wall with a clearance of 360 degrees thereabout with respect to the cylindrical wall of said chamber, a center post passing through said washers and interconnecting said end caps, and a threaded sealing plug for retaining said cartridge in said chamber, whereby there is provided a vapor generator cartridge and cartridge chamber allowing maximum utilization of vapor generating surface of said substance, together with ease of assembly, low cost of construction, ready replaceability and means for regulating the rate of vaporization proportional to the requirements of said dynamoelectric machine.

No references cited.